United States Patent [19]

Cohen et al.

[11] Patent Number: 5,355,221
[45] Date of Patent: Oct. 11, 1994

[54] ROUGH SURFACE PROFILER AND METHOD

[75] Inventors: Donald K. Cohen; Paul J. Caber, both of Tucson, Ariz.; Chris P. Brophy, White Bear Township, Ramsey County, Minn.

[73] Assignee: Wyko Corporation, Tucson, Ariz.

[21] Appl. No.: 143,372

[22] Filed: Oct. 25, 1993

Related U.S. Application Data

[63] Continuation of Ser. No. 48,747, Apr. 16, 1993, abandoned, which is a continuation of Ser. No. 880,083, May 6, 1992, Pat. No. 5,204,734, which is a continuation of Ser. No. 714,215, Jun. 12, 1991, Pat. No. 5,133,601.

[51] Int. Cl.$^5$ ............................................. G01B 11/00
[52] U.S. Cl. .................... 356/359; 356/381; 356/360; 356/376; 356/377; 382/8; 250/561
[58] Field of Search ............... 356/359, 381, 360, 376, 356/377; 382/8; 250/561

[56] References Cited

U.S. PATENT DOCUMENTS

| | | | |
|---|---|---|---|
| 4,732,483 | 3/1988 | Biegen | 356/351 |
| 4,791,584 | 12/1988 | Greivenkamp, Jr. | 364/525 |
| 4,813,782 | 3/1989 | Yagi et al. | 356/357 |
| 4,818,110 | 4/1989 | Davidson | 356/358 |
| 4,931,630 | 6/1990 | Cohen et al. | 250/201.3 |

OTHER PUBLICATIONS

"Profilometry With a Coherence Scanning Microscope", by B. S. Lee, and T. C. Strand, Applied Optics, vol. 29, No. 26, Sep. 10, 1990, pp. 3784–3788.
"First Results of a Product Utilizing Coherence Probe Imaging For Wafer Inspection", and Process Control II (1988); pp. 100–114.
"An Application of Interference Microscopy to Integrated Circuit Inspection and Metrology", by M. Davidson, K. Kaufman, I. Mazor, and F. Cohen, SPIE vol. 775, Integrated Circuit Metrology, Inspection & Process Control (1987), pp. 233–247.

Primary Examiner—Samuel A. Turner
Assistant Examiner—LaCharles P. Keesee, II
Attorney, Agent, or Firm—Charles R. Hoffman

[57] ABSTRACT

A method of profiling a rough surface of an object includes moving the object along a z axis so that a highest point of the rough surface is optically aligned with and outside of the focus range of a solid-state imaging array. An interferogram of the rough surface then is produced by means of a two beam interferometer. The solid-state imaging array is operated to scan the rough surface along x and y axes to produce intensity data for each pixel of the solid-state imaging array for a plurality of frames each shifted from the other by a preselected phase difference. The modulation for each pixel is computed from the intensity data. The most recently computed modulation of each pixel is compared with a stored prior value of modulation of that pixel. The prior value is replaced with the most recently computed value if the most recently computed value is greater. The object is incrementally moved a selected distance along the z axis, and the foregoing procedure is repeated until maximum values of modulation and corresponding relative height of the rough surface are obtained and stored for each pixel.

10 Claims, 2 Drawing Sheets

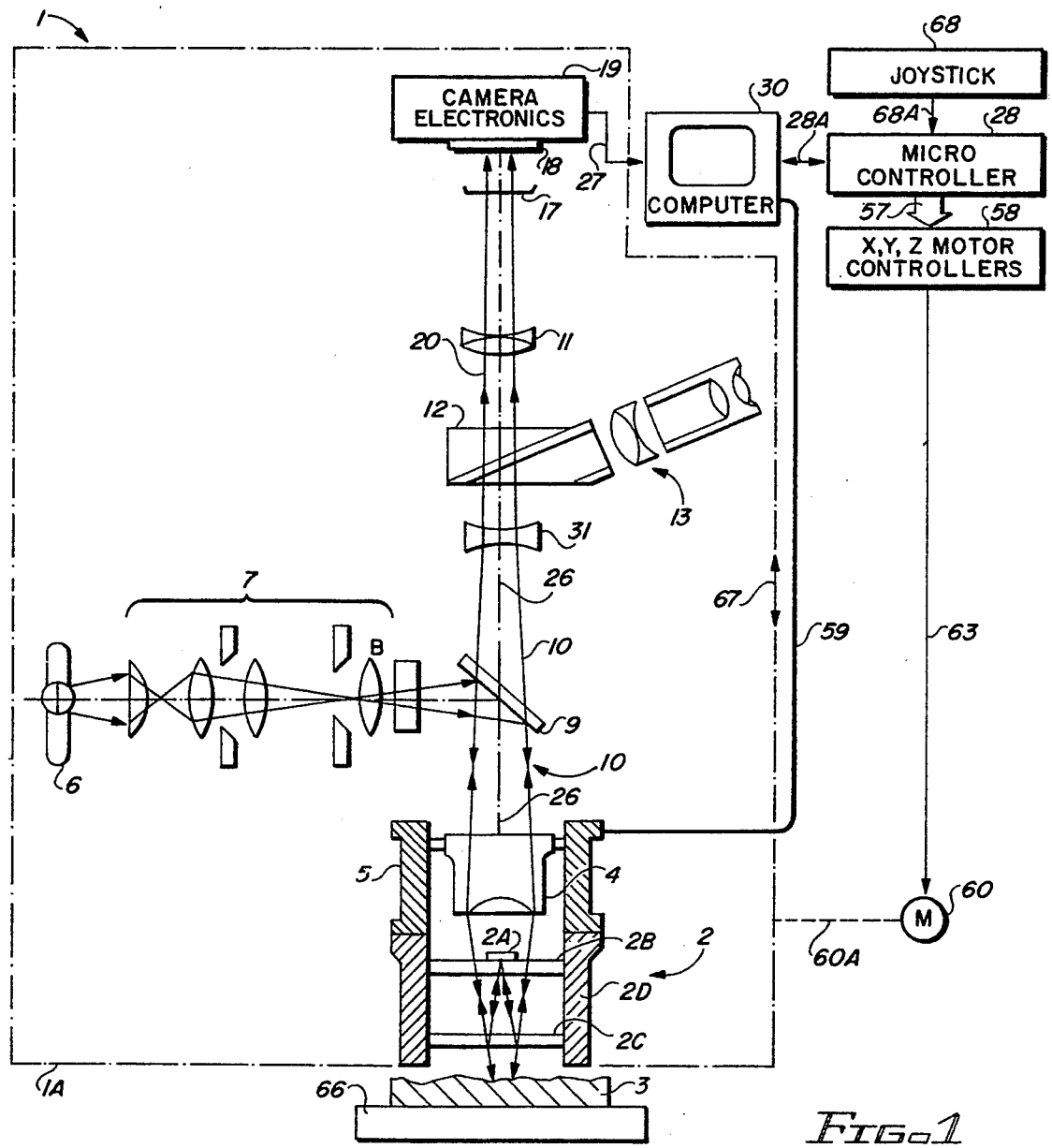
FIG. 1
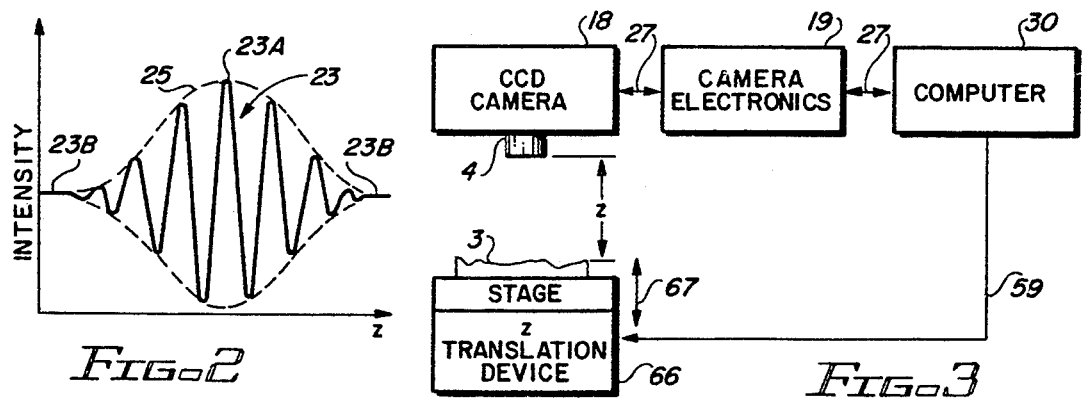
FIG. 2
FIG. 3

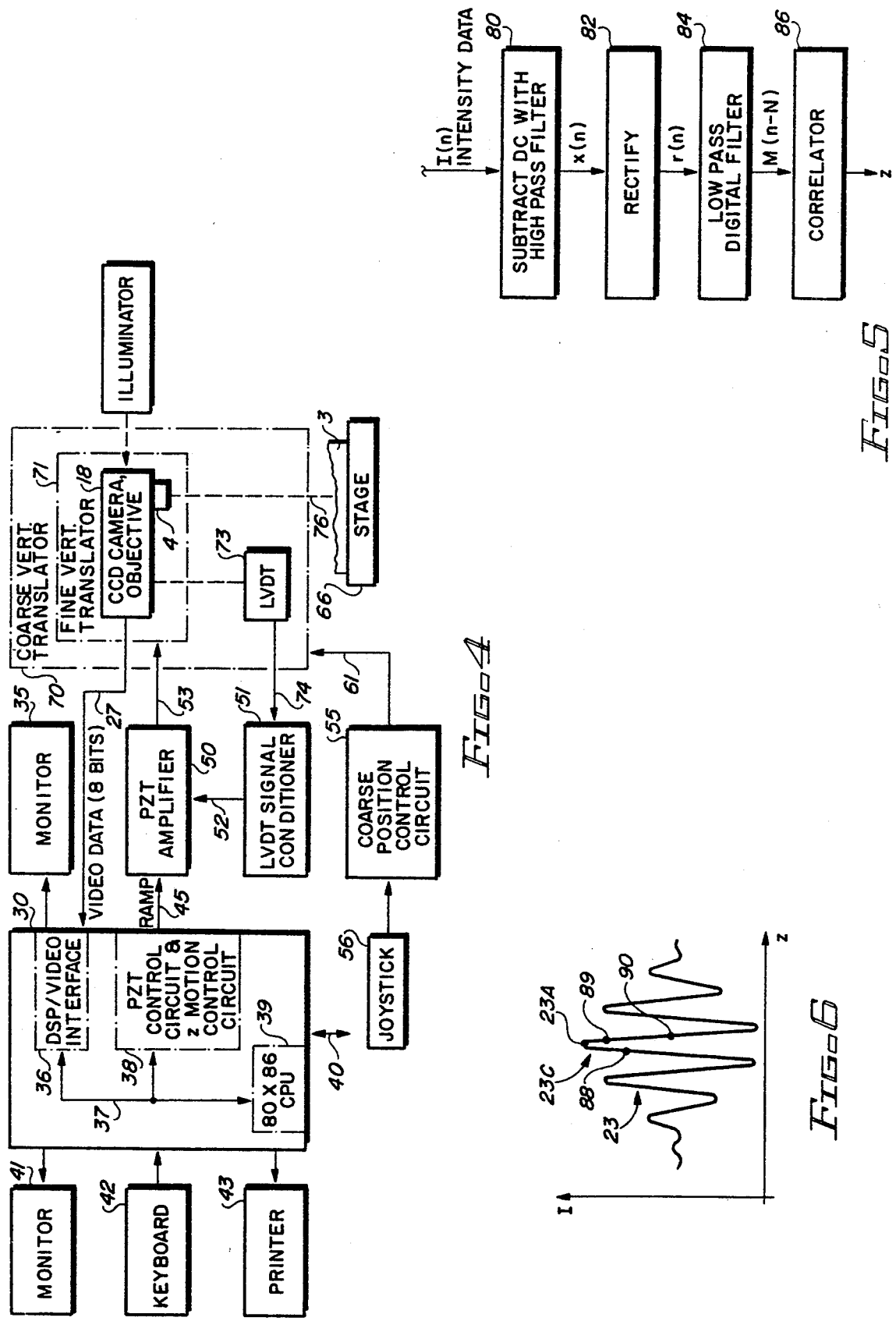

ROUGH SURFACE PROFILER AND METHOD

This is a continuation of patent application Ser. No. 08/048,747 filed Apr. 16, 1993, by Donald K. Cohen et al., and entitled "ROUGH SURFACE PROFILER AND METHOD", which is a continuation of patent application Ser. No. 07/880,083 filed May 6, 1992 by Donald K. Cohen et al., and entitled "ROUGH SURFACE PROFILER AND METHOD" now U.S. Pat. No. 5,204,734 which issued on Apr. 20, 1993, which is a continuation of patent application Ser. No. 07/714,215 filed Jun. 12, 1991 by Donald K. Cohen et al., and entitled "ROUGH SURFACE PROFILER AND METHOD", now U.S. Pat. No. 5,133,601 which issued on Jul. 28, 1992.

BACKGROUND OF THE INVENTION

The invention relates to an interferometric measuring device capable of profiling a surface with large height variations.

Conventional phase shifting interferometers require that the surface of an object being profiled be quite smooth, so that continuous interference fringes are produced by it. A large step change (i.e., a quarter of a wavelength of the light used to make the measurement or more) in the height of the surface often destroys the continuity of interference fringes, and consequently conventional phase shifting algorithms executed by a computer in response to fringe intensity data produced by a solid-state imaging array, such as a CCD array, are unable to accurately compute the profile of the surface.

At the present time, measurement of accurate profiles of surface areas is limited to RMS average roughness of approximately one thousand Angstroms using single wavelength interferometric techniques. Using multiple wavelength techniques (such as those described in commonly assigned U.S. Pat. No. 4,832,489, issued May 23, 1989, to Wyant et al.), surfaces with approximately one micron average roughness may be measured. With single wavelength techniques, the present state of the art limits measurement to surface step features of no greater height than approximately 0.16 microns. With multiple wavelength techniques, step height measurements are limited to steps less than approximately 15 microns in height.

U.S. Pat. No. 4,818,110 (Davidson) discloses a Linnik Microscope in combination with a video camera, a wafer transport stage, and data processing electronics, based on the use of an interference microscope to measure height and width of surface features on an integrated circuit. However, this reference does not disclose pixel-by-pixel mapping of the surface of a sample, does not generate a profile, and is incapable of generating an accurate pixel-by-pixel area profile of a surface that is too "rough" to be measured by conventional interferometry.

The article "Profilometry with a Coherent Scanning Microscope", by Byron S. Lee and Timothy C. Strand, Applied Optics, Volume 29, No. 26, Sep. 10, 1990, discloses a "coherence scanning microscope" in which an object is scanned in the z direction. White light interference fringes that result from the scanning are demodulated to find the peak amplitude of an envelope of the fringes to determine the value of z at the peak interference fringe. The Lee and Strand paper discloses no specific way of demodulating the fringes, and indicates that ambiguities introduced by phase change on reflection due to dissimilar materials renders the technique inoperable. No interpolation techniques or curve fitting techniques that might improve accuracy are disclosed. Optical path difference increments apparently are limited by the step size of stepper motors used, as is the speed of incrementing. The disclosed profile data is two-dimensional, rather than three-dimensional. The Lee and Strand reference clearly does not teach a technique to accomplish fast, highly accuracy surface profiling of surfaces having wide ranges of smoothness or roughness, or of dealing with phase ambiguity errors that result from phase change on reflection due, for example, to dissimilar surface materials.

Although phase-shifting techniques can produce measurements of surface roughness of the order of one thousandth of a wavelength, most present methods detect phase modulo $2\pi$, and consequently give rise to errors sometimes referred to as "$2\pi$ ambiguities" but hereinafter referred to as "phase ambiguities" or "phase ambiguity errors". Various kinds of "phase unwrapping" algorithms are used to track the phase over a large range of surface heights and resolve the phase ambiguity errors. Problems arise when there is a height variation between two adjacent pixels that cannot be unambiguously "unwrapped". The result is an integration error that usually manifests itself as a streak across the field of view.

It is well known that different materials on a surface to be profiled produce a phase shift known as "phase shift on reflection", which introduces phase ambiguity errors when conventional phase shifting techniques are utilized to determine the surface profile. More specifically, it is known that if the material of a surface being interferometrically profiled has optical properties such that the incident ray is delayed in phase by an appreciable amount, there will be a shift, i.e., by the "phase shift on reflection" in the phase of the fringe pattern received at the detector. Phase shifts which can cause phase ambiguity errors also may occur when there is a thin transparent film on the surface being optically profiled, because the film adds delay to the light propagation time therethrough.

There is an unmet need for an accurate, high speed, noncontact profiler capable of profiling a wide variety of rough surfaces.

SUMMARY OF THE INVENTION

Accordingly, it is an object of the invention to rapidly produce an accurate area profile of a rough surface having height variations that exceed the focus range of conventional interferometric profilers.

It is another object of the invention to provide a method and apparatus for accurate area profiling of a rough surface composed of differing materials which produce phase changes on reflection.

It is another object of the invention to provide a method and apparatus for interferometrically profiling rough surface areas without the need to use a phase unwrapping algorithm.

It is another object of the invention to provide a method and apparatus for interferometrically profiling rough surface areas very rapidly, without requiring excessive amounts of computer memory and algorithm execution time.

It is another object of the invention to provide an improved apparatus and technique for real time demodulation of interference fringe signals in an interferometric area profiling system.

It is another object of the invention to provide a method and technique for measuring surfaces with RMS average roughness of more than approximately one micron.

Briefly described, and in accordance with one embodiment thereof, the invention provides a method of profiling a rough surface of an object by producing an optical path difference so that initially a highest point of the rough surface is optically aligned with and outside of the focus range of a solid-state imaging array. Then an interferogram of the rough surface is produced by means of an interferometer. The solid-state imaging array is operated to scan the rough surface along x and y axes to produce intensity data for each pixel of the solid-state imaging array for a plurality of frames each shifted in time from the previous one to vary the optical path difference by a preselected phase difference. The contrast or modulation for each pixel is determined from the intensity data. That contrast or modulation is compared with a stored prior value of contrast or modulation of that pixel. The prior value is replaced with the most recently computed contrast or modulation if the most recently computed one is greater than the one previously stored. The corresponding relative height or optical path difference is also stored for that pixel. The optical path difference is either incrementally or linearly varied through a selected distance, and the foregoing procedure is repeated until maximum values of contrast are obtained and stored for each pixel. In one embodiment, the modulation is computed from intensity data obtained during conventional phase-shifting interferometric measurements. In another embodiment, the phase is also computed for each pixel from the intensity data and is used along with the modulation to improve vertical resolution. In another embodiment, intensity data is "amplitude demodulated" using classical communications theory to extract an "envelope" of the intensity data and determine the peak thereof. The envelope signal or modulation signal is "separated" from the "carrier" signal of the intensity waveform produced as the solid-state imaging array passes through focus. The separation is accomplished by a digital low pass filtering operation. The resulting separated modulation signal is input to a digital correlator which detects the peak and correlates it to the surface height of the present pixel.

BRIEF DESCRIPTION OF THE DRAWINGS

FIG. 1 is a diagram of the rough surface profiler of the present invention.

FIG. 2 is a diagram showing an output signal that can be produced by detector cells in FIG. 1 as the optical path difference is varied through the best focus point of the objective.

FIG. 3 is a simplified block diagram of another embodiment of the invention.

FIG. 4 is a detailed block diagram of another embodiment of the invention.

FIG. 5 is a flow chart useful in describing the operation of the embodiment of FIG. 4.

FIG. 6 is a diagram useful in explaining a phase interpolation technique to improve resolution of surface height measurements.

DETAILED DESCRIPTION OF THE PREFERRED EMBODIMENTS

Referring to FIG. 1, rough surface profiler 1 includes a Mirau interferometer 2 having a reference mirror 2A on a glass plate 2B, and a beamsplitter 2C. A microscope objective 4 is supported above a test surface 3 by a piezoelectric transducer (PZT) 5. PZT 5 is supported by a frame of Mirau interferometer 2. Mirau interferometer 2 is supported by the frame of microscope section 1A. The vertical or z position of microscope section 1A is controlled by a motor 60, which is connected by a mechanical link 60A to microscope section 1A. Test surface 3 is supported on a stage 66. The optical path difference (OPD) is precisely controlled by PZT 5 in response to PZT driver signal 59 produced by computer 30. Motor 60 is controlled by signal 63 produced by motor controller circuitry 58.

A white light source, which can be a typical quartz halogen lamp, directs white light through a typical commercially available illumination assembly 7, which directs the white light beam onto an ordinary beamsplitter 9. Beamsplitter 9 reflects the white light beam 10 into the upper end of microscope objective 4.

The beams reflected from the reference mirror 2A and the sample surface 3 then pass back up through microscope objective 4, upward through beamsplitter 9, through a collimating lens 31, and through a multilayer-coated beamsplitter 12 which deflects approximately 30 percent of the interference beam 20 into eyepiece assembly 13. Most of the interference beam 20 continues upward through imaging lens 11 to solid-state imaging array 18. Camera electronics 19 processes the signals of the individual CCD (Charge Coupled Device) cells or other solid-state imaging array cells of solid-state imaging array 18 and outputs them via bus 27 to computer 30. Computer 30 communicates via bus 28A with microcontroller 28.

Microcontroller 28 can be an Intel 8098. Block 68 includes a z joystick controller by means of which an operator can manually control motor 60 to control the vertical position of microscope section 1A relative to sample surface 3, and is connected by suitable conductors 68A to inputs of microcontroller 28. Microcontroller 28 communicates by bi-directional bus 28A with computer 30, which can be a desk-top computer in combination with a commercially available WYKO PMI (Phase Measuring Interface). Microcontroller 28 generates outputs 57 which control motor controller circuitry 58. Microcontroller 28 and motor controller circuitry 58 actually are included in the above WYKO PMI unit.

A filter may be positioned under solid-state imaging array 18 and camera scanning electronics 19. The signals produced by detector array 18 represent profile of sample surface 3, and are scanned by camera scanning electronics in block 19 which produce amplified signals on bus 27 that are digitized and input to computer 30 for suitable processing in accordance with the needs of the user.

The reference path and sample path in Mirau interferometer 2 are essentially identical except that the reference path is focused on mirror surface 2A and the sample path is focused on the test surface 3. Numeral 26 designates the vertical z axis of interference microscope 1.

The waveform shown in FIG. 2 is typical of those produced by the individual CCD cells in detector 18 in response to light of the interferogram impinging on detector array 18 as the optical path difference is changed. It is seen that this response is very peaked, and identification of the ideal microscope objective focus point is quite distinct. Dotted line 25 designates an "envelope" of waveform 23, which in accordance with one embodiment of the invention, is extracted from the "carrier signal" using classical communications techniques to obtain the "modulation" signal that is highest when the microscope objective is optimally focused on the rough sample surface at the pixel under consideration.

The image formed by a properly focused interference microscope typically consists of a pattern of light and dark alternating interference fringes. The number of fringes and the orientation of the fringes across the image plane are dependent on the relative tilt between the sample surface and the reference surface. Interference microscopes are assembled such that the brightest fringe occurs at "best focus" i.e. within the depth of focus of the microscope objective.

FIG. 3 shows a simplified diagram of a different embodiment of the invention in which the stage 66, rather than the microscope objective, is vertically moveable in the z direction. Stage 66 is precisely moveable, either linearly or in minute (e.g., 0.1 micron or less) increments in response to increment signals 59 from computer 30.

The specimen to be profiled has a "rough" surface 3, as in FIG. 1, that exceed height variations which can be profiled by the closest prior art interferometer-type surface profilers. Solid-state imaging array 18, which has an objective 4, is supported in a fixed position above stage 66. Camera electronics 19 are connected by bidirectional bus 27 to solid-state imaging array 18 to control scanning of rough test surface 3 by the solid-state imaging array in camera 18 and to receive intensity data from each pixel of the solid-state imaging array. Camera electronics 19 communicate with computer 30, mainly to supply measured pixel intensity data to it. Computer 30 executes software that converts the data into a surface profile and may perform further analysis thereon, and displays the surface area profile and/or analysis results on a screen, or outputs the data to control a plotter that plots the surface profile. In FIG. 3, the elements of the interferometer that produce the fringe pattern (which results from interference between source light reflected from rough surface 3 and a reference surface) viewed by solid-state imaging array 18 are omitted, for simplicity. The interferometer hardware is similar to that shown in FIG. 1.

In accordance with the present invention, either stage 66 is lowered (FIG. 1) or microscope objective section 1A is raised (FIG. 3) so that the image of rough surface 3 is beyond the range of solid-state imaging array 18. Then, computer 30 causes the OPD between solid-state imaging array 18 and the rough surface 3 to be either reduced in minute (e.g., 0.1 micron) increments or reduced linearly and sampled at the same increments by controlling the position of stage 66. For each such increment, solid-state imaging array 18 scans rough surface of sample 3. The intensity data of the interference fringe pattern is sent to computer 30 after the intensity data has been converted to digital form by camera electronics 19.

Computer 30 then, for each pixel (i.e. , x-y location) scanned by the solid-state imaging array 18, computes the modulation (or other suitable parameter) of that pixel, and compares it with the highest modulation stored so far for that pixel. If the new contrast or modulation is higher than the prior highest stored modulation, computer 11 updates the stored highest modulation by replacing it with the new one, and also stores the corresponding value of OPD or relative surface height presently being scanned.

After this has been accomplished for every pixel of solidstate imaging array 30 for the present value of z, the OPD is, in effect, incremented and the entire process is repeated. This happens many times, until the OPD or relative surface height variable z has changed enough to pass the best focus point of objective 4 through the maximum possible height range of all of the rough surface features of rough surface 3 in the field of view.

When the process is completed, computer 30 then has stored both the maximum contrast for each pixel and the value of z constitutes the profile of the surface 3.

The advantage of the forgoing technique is that it does not require any continuity of fringes on steep, high step features of specimen surface 3.

The general interference equation for the intensity measured in a 2-beam interferometer is as follows:

$$I = I_0[1 + M\cos(\phi + \alpha)],$$

where $I_0$ is the DC bias term, $\phi$ is the initial phase angle, $\alpha$ is the incremental phase change, and M is the modulation.

Phase-shifting techniques usually make use of a narrow-band light source and assume that M is constant throughout the measurement. Multiple frames of data are taken while the OPD is varied by a known amount between each frame. The resulting group of above equations (1) then can be solved using least-squares techniques or the like to determine the phase of each pixel at which the intensity is measured. The relative height at each pixel then is given by the formula $$z = \frac{\lambda}{4\pi} \phi$$

The present invention makes use of the modulation information and the interference data corresponding to each pixel at which the intensity of the sample is measured, and correlates that information to the relative surface height of the sample at that pixel. If a broad bandwidth source, i.e., white light, is used instead of a filtered narrow bandwidth light source, the intensities of the fringes produced fall off sharply as the optical path difference is varied, as indicated in FIG. 2.

If the assumption is made that the maximum value of modulation M occurs when the OPD is near zero, then the position of the peak of the modulation function may be used to map the relative surface height throughout the field of view. The modulation function has the advantage of being non-periodic, and therefore will not have the above mentioned phase ambiguity errors.

It should be noted that measuring the modulation of fringes produced by a white light source is somewhat problematic. If standard phase-shifting methods are used to solve the basic interference equation for modulation M, the phase shift between frames must be very accurately calibrated. This becomes difficult due to spectral variations in the reflectivity oE the sample and variations in the peak wavelength of the light source. The basic interference equation (1) assumes that the modulation is constant with respect to z, which of course is not true for a white light source. The result is a very noisy modulation signal. Even so, respectable results were obtained on "very" rough surfaces using the methods described herein, because the modulation noise was small compared to the roughness of the surface.

In one experimental embodiment of the invention, phase information was used along with modulation information to improve the resolution. In another (presently preferred) embodiment of the invention, "amplitude demodulation" of the fringes was performed using techniques similar to those used in AM radio receivers.

An initial attempt at profiling a rough surface used a stepper head and motor-driven micropositioner as shown in FIG. 3 to produce relative translation of the test surface 3 along the z axis. Standard interferometric phase-shifting techniques were used to obtain intensity data used to compute the modulation. This first attempt proved the general workability of the concept of focusing the microscope on each point of the rough surface to obtain a surface map of values of z at which maximum modulation was computed for each pixel, but worked well only for very rough surfaces. A second attempt used computed phase information, in addition to the computed modulation information, from the measured intensity data to improve measurement resolution. A third attempt, which seemed to produce the best results, used amplitude demodulation techniques somewhat similar to those commonly used in communications systems to decode the modulation function. These three experimental embodiments of the invention will now be described in detail.

The above-mentioned initial attempt to implement the invention used hardware similar to that of FIG. 3, which is a simplified diagram that, for simplicity of illustration, omits the interferometer elements shown in FIG. 1. A vertical translating stage (a KLINGER P/N UZ80 PP) was used to vary the OPD by moving the rough sample surface 3 through "focus" (i.e., the best focus point of microscope objective 4), as controlled by a Hewlett-Packard 330 microcomputer, through a programmable indexer (a KLINGER P/N CC-1.2). The assignee's commercially available TOPO 3D version 4.9 software, revised slightly to provide suitable control of stage 66 and to make calculations described hereinafter, was used. The assignee's standard TOPO five-frame phase-shifting algorithm was used to collect five intensities $I_1$–$I_5$ at each pixel for each OPD value. The intensities were used to calculate the modulation M at each pixel in accordance with the equation $$M = \frac{\sqrt{(2I_3 - I_1 - I_5)^2 + 4(I_2 - I_4)^2}}{2I_0} \quad (3)$$

$I_1$–$I_5$ are five consecutive frames of intensity data for every pixel, taken with relative phase shifts of $\pi/2$ between the frames, $I_0$ being the average light level, which is constant and need not even be used if the purpose of the computations is to find the value of z at which the maximum modulation occurs.

Stage 66 (FIG. 3) was stepped at a 0.1 micron rate for a sufficient total scan length that the entire range of surface height of rough sample surface 3 could pass through focus. More specifically, at each step the piezo-electric transducer (PZT) 5 (e.g., see FIG. 1) was shifted, and five frames of intensity data were taken. The value of M was calculated in accordance with equation (3) for each pixel, and then was compared to a previously stored value. For each pixel, if the new value of M was larger than the previously stored one for that pixel, the new value of M was stored, along with the current z value. Thus, after a complete scan, a complete profile of rough surface 3 consisting of the relative surface height of each pixel at which the maximum modulation or fringe contrast occurred was stored.

The resolution obtained for the above described initial experiment was reasonably good, but not satisfactory. The experiment was repeated, but with the "best focus" of each pixel being selected as the point at which the intensity for that pixel was maximum. However, the results were no better. The same experiments were performed for both filtered light and white light, using a standard GAR P/N S-22 for the purpose of evaluating performance of the device. The amount of time taken to execute the frame shifting algorithm was considered to be too long. Varying degrees of "noise" or error were present on smoother samples, although good results were obtained for the roughest samples, which had peaks of about 30 microns.

In a second attempt to improve the resolution, phase information was used in addition to the modulation M computed in accordance with equation (3), in the hope of obtaining better resolution than the 0.1 to 0.6 micron resolution obtained for the above described embodiment of the invention. The vertical distance between measurements was selected to equal approximately one eighth of the mean wavelength of the broadband light source. The equations used for 3-frame phase shifting with a linear ramping of the OPD with distance or time precisely producing 90 degree phase shifts between frames, are as follows:

$$M = \frac{\sqrt{(I_1 - I_2)^2 + (I_3 - I_2)^2}}{\sqrt{2}\, I_0} \quad (4)$$

$$\phi = \tan^{-1}\frac{(I_3 - I_2)}{(I_1 - I_2)} \quad (5)$$

$$z = \frac{\lambda}{8}\,(\text{step number}) + \phi\frac{\lambda}{4\pi} \quad (6)$$

The step size was calibrated for a phase shift of $\pi/2$. The algebraic signs (i.e., + or −) of the numerator and denominator of equation (5) are used along with the modulation M of equation (4) calculated at each step, and the new modulation M is stored only if both signs are negative and M is greater than the previous stored value. For this value of z, the phase is also calculated from the measured intensity values and also stored with the current step number. This technique ensures that the peak modulation M is always stored in the same quadrant along with the peak of the fringe and that the phase calculated there will be independent of the phase calculated at adjacent pixels.

The profile of the test surface 3 then is produced at the end of the measurement by taking each stored "step number" (the step number is a variable that is incremented for each phase shift) and multiplying that by the distance per step, and adding or subtracting an incremental distance from that using the corresponding phase data, as indicated by equation (6). This is done for each pixel scanned. The result is a complete three dimensional map which is obtained without the need for phase discontinuity removal techniques, and thus is inherently free from integration errors.

The resulting resolution of this technique produced much higher resolution, almost as good as the assignee's TOPO 3D system, for smooth, flat surfaces. Measurement of rougher samples produced good results similar to those obtained for the first-described technique. Moderately rough surfaces, however, sometimes produce measurements with random spikes that occur at offsets of approximately $2\pi$ from surrounding features. It is believed that these phase ambiguity errors resulted from not being able to reliably detect the peak fringe position, causing the calculated z value to jump to the next fringe, a distance of $2\pi$ away. Some of these phase shifts are believed to be due to phase shift on reflection. Thin transparent or semi-transparent films (of thickness less than a coherence length of the light source) also produce similar phase shifts. Although the foregoing technique produced very good results on "very" rough surfaces (e.g., several microns RMS roughness), on "moderately" rough surfaces (e.g., 100 to 300 nanometers RMS roughness), it was clear that additional processing would be required to detect the peak fringe and that it would be necessary to continually recalibrate the phase shift produced by PZT 5, as the accuracy of such shifting was found to be critical.

Referring to FIG. 6, the above-mentioned improvement in resolution is accomplished by "offsetting" the phase $\phi$ between intensity measurement points such as 88, 89 and 90 on the highest intensity fringe 23C of intensity waveform 23. The highest intensity fringe 23C is previously isolated by using the peak of envelope 25 of intensity waveform 23C shown in FIG. 2. Points 88, 89, and 90 indicate already measured intensity points at phases spaced $\pi/2$ apart. The above-described resolution problem is caused by the fact that none of intensity measurement points 88, 89, or 90 is located at the value of z at which the peak 23A is located. In order to get an accurate value of the right hand "phase offset term" in equation (6), the present invention involves computing values of M "on the fly" according to equation (4) using intensities measured from points 88, 89, and 90 and storing that value if both 1) it is the highest value of M computed so far, and 2) the terms $(I_1-I_2)$ and $(I_3-I_2)$ are both negative or one is negative and the other zero. When that condition is met, the phase offset term $\phi$ is computed according to equation (5), and is used to "adjust" or "refine" the more approximate value given by the left term of equation (6). This later term represents the peak of the modulation envelope 25 (FIG. 2). It should be noted that the actual phase of the peak modulation relative to the height calculated using equation (6) is $3\pi/2$, but since this relative offset is added to every pixel, the net result is the same. (Those skilled in the art know that the basic interference equation is equation (1), which has three unknown variables. Therefore, at least three measurements of intensity must be measured at different phases to solve for the three unknown variables. Measurement of additional values of intensity at additional phases can, as a practical matter, further improve accuracy of phase computation if the well known least squares technique is used to solve for the unknown variables.)

The above-mentioned third embodiment of the invention involved modifying the system of FIG. 1 so as to produce the system essentially as shown in FIG. 4. In FIG. 4, microcomputer system 30 includes a "frame processor" 36, which can be a digital signal processor (DSP) board plugged into a back plane bus 37 of an IBM AT computer system. Vertical motion control circuitry and PZT control circuitry in block 38 also is connected to the internal bus 37 and to digital signal processor 36. An 80X86 CPU 39 that is connected to internal bus 37 is the main processor of microcomputer system 30. An optional color video monitor 35 can be connected to digital signal processor and video interface circuit 36, for the purpose of effectuating real time video display.

Numeral 41 designates a conventional color monitor of microcomputer system 30, to which keyboard 42, printer 43, and work station bus 40 also are connected. The PZT control circuitry in block 38 produces a linear ramp signal 45 that drives a PZT amplifier 50, which can be a conventional amplifier such as the one used in the assignee's commercially available TOPO 3D system. PZT amplifier 50 produces a high voltage PZT drive signal on conductor 53 to control a PZT (not shown) that is used to increment the fine vertical translator 71, which is shown in FIG. 4 as being "nested" in a coarse vertical translator 70. (OPD variation can, of course, also be produced by incrementing the stage 66 in the z direction.) Coarse vertical translator 70 is driven in response to a circuit shown in block 55, which can be an "autofocus" printed circuit board contained in the assignee's commercially available TOPO A/F system. The coarse position control signal on conductor 61 controls coarse vertical translator 70.

The relative position of test surface 3 and optical system 18 is measured by a conventional linear variable differential transducer (LVDT) 73 or the like, which produces signals on conductor 74 and inputs them to LVDT signal conditioning or buffer circuitry 51. LVDT signal conditioning circuit 51 produces an output signal which is applied as an input to PZT amplifier 50, and also supplies an encoded voltage on conductor 52 to the PZT control circuitry in block 38. The encoded voltage on conductor 52 represents the precise position of the solidstate imaging array 18 relative to the present pixel of rough surface 3. Dotted line 76 designates an optical coupling between solid-state imaging array 18 and rough surface 3.

LVDT signal conditioning circuit 51 produces very precise feedback in the form of encoder voltage 52 indicating the present position of the objective of solid-state imaging array 18. PZT control circuitry in block 38 adjusts the ramp signal on conductor 45 so that solid-state imaging array 18 moves very linearly. The PZT control circuitry in block 38, PZT amplifier 50, PZT included in fine vertical translator 71 of FIG. 4, LVDT 73, and LVDT signal conditioner 51 function as a servo circuit that maintains the translation or variation of the OPD precisely linear.

Waveform 23 in FIG. 2 is of the same general shape for each of the intensity signals produced at the outputs of each of the pixels of solid-state imaging array 18 as the OPD is incrementally or linearly ramped so that the microscope objective 4 scans through the entire range of rough surface features of test surface 3. This waveform can be considered to be analogous to an ordinary AM radio signal. Waveform 23 of FIG. 2 is defined by the above interference equation of equation (1)

$$I = I_0 + I_{\infty} + M\cos(\phi + \alpha). \quad (1)$$

It is useful to compare this equation to the equation for an amplitude modulated rf signal, used in radio communications:

$$s(t) = [1 + m(t)]U\cos(2\pi ft + \alpha),$$

where s(t) is the product of a modulating signal s(t)=1+m(t) and a sinusoidal carrier signal $U\cos(2\pi f t+\alpha)$, where U is a constant. The two equations (1) and (7) are very similar, with the optical interference signal of equation (1) offset by the DC term $I_0$. Those skilled in the electronic communications art know that amplitude modulation is generally defined as a linear operation where a frequency translation of a modulating signal is performed by multiplication of the signal by a sinewave carrier. Amplitude demodulation is a reverse operation, i.e., the reconstruction of the modulating signal from the modulated signal. The technology for accomplishing this is well known to those skilled in the communications art.

It was hoped that the same demodulation techniques that apply to classical AM detection theory would apply to obtaining the modulation envelope 25 and "detecting" its peak to profile rough surface 3.

A basic operation that must be accomplished to make the above-mentioned amplitude demodulation technique work in the present invention is the separation of the modulation signal from the carrier signal in the frequency domain by use of a low pass filter. For example, in an AM radio, the low pass filtering is typically accomplished by using a simple RC network. However, the filtering of the fringe intensity data becomes more complicated, due to the fact that the intensity data through focus for each pixel is not available as a continuous analog signal, as in the case of an AM radio, but instead is sampled and digitized once each video frame.

Therefore, a digital technique must be used to perform the low pass filtering function. One possibility to accomplish the low pass filtering would be to perform a Fourier transform on the data collected for each pixel for an entire measurement and then perform "computational filtering" in the Fourier domain. This approach would require storing a large number of frames of video data, thereby imposing massive memory requirements on the system. Another possibility for performing the low pass filtering would be to use a digital filter algorithm to calculate a new filter output at each step (i.e., at each OPD) of the profiling process. The amount of memory required then would be reduced to one frame of video data for each "order" of the filter. The higher the order of the filter, the steeper its cutoff characteristics are, indicating better separation of the modulation envelope and the carrier signal. The details of the design are common knowledge, and are selected from pages 218 to 223 of "*Digital Signal Processing*" by J. V. Oppenhiem and R. W. Schafer, Prentice-Hall, New Jersey, 1975.)

The flow chart of FIG. 5 shows the operation of "extracting" or detecting the "envelope" 25 of waveform 23 in FIG. 2. The peak of the envelope 25 then corresponds to the point of best focus, and therefore correlates to the relative height of the present pixel of rough surface 3.

The intensity data obtained from the phase shifting operation is shown in FIG. 5 as an input to block 80, in which the sampled intensity data I(n) is stripped of the DC component $I_0$, by use of either a digital high pass filter or by subtracting an average DC value from the intensity signal produced by each pixel (by digital low pass filtering or averaging techniques).

As shown in block 82, the resulting signal x(n), then is "rectified" to perform the needed frequency separation. The rectification process in an AM radio typically is implemented using a simple solid state diode circuit. However, to rectify the signal in a digital or time-sampled domain, a non-linear operation such as taking an absolute value or performing a mathematical squaring or the like must be applied to the discrete data. The result is a signal r(n) that now has the frequency components of the modulation signal moved to a lower frequency, while the frequency components of the fringes have been multiplied by a factor of 2 in the frequency domain.

The modulation signal M(n-N), where N is the "order" of the filter, then can be separated by the digital low pass filtering operation, as indicated in block 84 of FIG. 5. This modulation signal M then is input to a correlator that detects the peak (and/or other features) of the modulation signal M and correlates the feature(s) to the relative surface height z of the present pixel, as indicated in block 86.

For the initial implementation of a so-called IIR (infinite impulse response) digital filter (which is preferred because it generally will lead to a simple implementation and require far less memory space for storage of the delay terms than an FIR (finite impulse response filter), a fourth order Chebyshev design with a cutoff frequency of approximately $0.2\pi$ was chosen.

The algorithm executed to implement the above digital filter is as follows. First, the intensity signal from the detector is averaged for eight frames at the beginning of a measurement, during which time the data points all remained above "focus", i.e., outside the coherence length of the light source. The PZT stage 5 (FIG. 1) or other OPD translating technique in effect moves rough surface 3 through "focus" at a fixed rate, and the data is taken at fixed time intervals such that the distance moved between frames is approximately 50 nanometers.

After the eight frames of intensity data are taken for each pixel of solid-state imaging array 18, the average of the eight frames is compuoted and subtracted from each intensity value obtained throughout the measurement. At this point the delay terms (4 frames) are cleared, and the signal can begin to be input to the digital filter. Meanwhile, the PZT continues to ramp at the same rate of 50 to 100 nanometers per step.

The above technique involving averaging the first eight frames is performed for the purpose of obtaining the "DC" value $I_0$ referred to previously. That $I_0$ then is subtracted from each intensity value obtained during the measurement process in order to obtain a signal with no DC component. Alternatively, the same objective can be achieved by filtering the intensity signal using a digital high pass filter with a form similar to the low pass filter described above.

The DC-subtracted signal then is rectified by one of two methods, by taking the absolute value of the data or by squaring the data. The method to be used is selected by the user at the start of each measurement. The rectified signal then is input to the fourth order IIR low pass digital filter described above. At each step after the fourth, a new value of modulation is output for each pixel.

The modulation calculated by the filter then is compared with the maximum modulation computed up until that step, and if the current value is greater than the previous value, the current value is stored along with values computed at the previous steps. This requires the storing of the last three frames of modulation output for all pixels. The step where the maximum modulation occurred also is stored.

After the measurement is complete, interpolation by quadratic fitting is performed on three points saved for each pixel, to determine the actual surface height at that point. If the three modulation values taken in the vicinity of the peak of the modulation function are $Y_1$, $Y_2$, and $Y_3$, with $Y_2$ being the highest value of the three, three equations can be written relating each point to a point on a quadratic equation:

$$y = a_0 + a_1 z + a_2 z^2 \qquad (8)$$

where $z_1$, $z_2$, and $z_3$, are relative positions or offsets from the position of the peak value, with $z_1 = -1$, $z_2 = 0$, and $z_3 = 1$.

The three equations can be solved for the three unknowns $a_0$ $a_1$ and $a_2$, and the expression for the interpolated offset from $z_2$ to the position of the peak modulation value is given by the expression $$\Delta z_{peak} = \frac{y_1 - y_3}{2y_1 - 4Y_2 + 2Y_3} \qquad (9)$$

The result then is multiplied by the step size to obtain the relative height of the present pixel of the rough surface 3.

The above digital filter algorithm was used to test a wide variety of rough surfaces, and much better results were obtained than for the first two approaches described above. No phase ambiguity offset errors were observed, and no errors due to phase shifts (for example due to presence of thin films or phase shift on reflection), were observed. Measurement resolution of less than 10 nanometers was achieved. The technique worked well over a wide range of PZT ramp signal slopes, source illumination levels, source filtering, etc. No recalibration of PZT ramp signal slope was necessary for different sample types.

It therefore was concluded that the use of digital filtering algorithms is a very robust technique, the performance of which can be further improved by better filter design, better DC tracking (which can be accomplished by the above-mentioned high pass filtering), and more "intelligent" peak detectors.

In another embodiment of the invention, relative height values for the various pixels of rough surface 3 that correspond to the peak of modulation envelope 25 can be used to eliminate the phase ambiguity errors from the height measurement for each pixel. By determining the peak of the modulation envelope, the described digital filtering techniques, in combination with the described phase measurement techniques, it is possible to obtain better resolution of the surface profile. The peak of modulation envelope 25 indicates a "coarse" measurement resolution, and the phase measurement technique provides additional more accurate measurement values which, in accordance with the second term of equation (6), are added to the initial measurement to provide increased resolution. Thus, relatively smooth surfaces can be very accurately profiled using the disclosed phase measurement techniques, and very rough surfaces can be very accurately profiled using the described modulation techniques. The immediately foregoing peak modulation "interpolation" techniques allow measurement of surfaces of "intermediate" roughness with approximately the same resolution as can be obtained in profiling very rough surfaces by combining both techniques sequentially in accordance with equation (6). That is, the modulation envelope peak measurement technique is first used to get a rough measurement, and then the phase measurement technique is used to further refine that measurement.

The present invention thus provides a means of using a combination of interferometric techniques to make fast area measurements very accurately of surfaces of any degree of smoothness or roughness.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method of profiling a surface of an object, comprising the steps of:
   (a) positioning the object along an optical axis so that the object surface is optically aligned with an imaging device;
   (b) producing an interference pattern of the object surface by means of an interferometer;
   (c) varying an optical path difference between the object and a reference surface of the interferometer;
   (d) operating the imaging device to scan the object surface to produce intensity data for each pixel of an image of the object surface;
   (e) removing a constant or slow-changing component from the intensity data, as the optical path difference is varied, to produce a first digital signal;
   (f) rectifying the first digital signal to produce a second digital signal including a high frequency component and a low frequency component;
   (g) digitally filtering the second digital signal to eliminate the high frequency component from the second digital signal to thereby produce a third digital signal;
   (h) locating a preselected characteristic of the third digital signal for each pixel; and
   (i) correlating the preselected characteristic of the third digital signal to a relative height of the object surface for each pixel.

2. A device for profiling a surface of an object, comprising in combination:
   (a) an imaging device;
   (b) means for moving the object along an optical axis so that a portion of the object surface is optically aligned with the imaging device;
   (c) an interferometer, and means for producing an interference pattern of the object surface by means of the interferometer;
   (d) means for operating the imaging device to scan the object surface to produce intensity data for each pixel of an image of the object surface
      i. means for measuring a position value corresponding to the relative distance between the object surface and a reference surface in the interferometer and producing a position signal representing the position value,
      ii. means for applying the position signal as position feedback to a control circuit driving a translator connected to vary the relative distance between the object surface and the reference surface, and iii. means for operating the control circuit in response to the position signal to precisely linearly adjust the relative distance between the object surface and the reference surface;
(e) means for computing information representative of variations in amplitude of intensity for each pixel from the intensity data;
(f) means for comparing a most recently computed value of the information for each pixel with a stored prior value of the information for that pixel;
(g) means for replacing the prior value of the information with the most recently computed value of the information if the most recently computed value of the information is greater than the prior value of the information;
(h) means for obtaining and storing a corresponding relative height of the object surface if the most recently computed value of the information is greater than the prior value of the information; and
(i) means for varying the relative distance between the object surface and the reference surface until maximum values of the information and corresponding relative heights of the object surface are obtained and stored for each pixel, respectively.

3. A device for profiling a surface of an object, comprising in combination:
(a) an imaging device;
(b) means for moving the object along an optical axis so that the object surface is optically aligned with the imaging device;
(c) an interferometer, and means for producing an interference pattern of the object surface by means of the interferometer;
(d) means for operating the imaging device to scan the object surface to produce intensity data for each pixel of an image of the object surface, including
  i. means for measuring a position value corresponding to the relative distance between the object surface and a reference surface in the interferometer and producing a position signal representing the position value,
  ii. means for applying the position signal as position feedback to a control circuit driving a translator connected to vary the relative distance between the object surface and the reference surface, and
  iii. means for operating the control circuit in response to the position signal to precisely linearly adjust the relative distance between the object surface and the reference surface;
(e) data processing circuitry adapted to remove a constant or slow-changing component from the intensity data, as the optical path difference is varied, to produce a first digital signal;
(f) means for rectifying the first digital signal to produce a second digital signal including a high frequency component and a low frequency component;
(g) means for digitally filtering the second digital signal to eliminate the high frequency component from the second digital signal to thereby produce a third digital signal;
(h) means for locating a preselected characteristic of the third digital signal for each pixel; and
(i) means for correlating the preselected characteristic of the third digital signal to a relative height of the object surface for each pixel.

4. A device for profiling a surface of an object, comprising in combination:
(a) an imaging device;
(b) means for moving the object along an optical axis so that the object surface is optically aligned with the imaging device;
(c) an interferometer, and means for producing an interference pattern of the object surface by means of the interferometer;
(d) means for operating the imaging device to scan the object surface to produce intensity data for each pixel of an image of the object surface, including
  i. means for measuring a position value corresponding to the relative distance between the object surface and a reference surface in the interferometer and producing a position signal representing the position value,
  ii. means for applying the position signal as position feedback to a control circuit driving a translator connected to vary the relative distance between the object surface and the reference surface, and
  iii. means for operating the control circuit in response to the position signal to precisely linearly adjust the relative distance between the object surface and the reference surface;
(e) means for determining a preselected characteristic of the intensity data for each pixel; and
(f) means for correlating the preselected characteristic to a relative height of the object surface for each pixel.

5. A method of profiling a surface of an object, comprising the steps of:
(a) positioning the object along an optical axis so that the object surface is optically aligned with the imaging device;
(b) producing an interference pattern of the object surface by means of an interferometer;
(c) operating an imaging device to scan the object surface to produce intensity data for each pixel of an image of the object surface, by
  i. measuring a position value corresponding to the relative distance between the object surface and a reference surface in the interferometer and producing a position signal representing the position value,
  ii. applying the position signal as position feedback to a control circuit driving a translator connected to vary the relative distance between the object surface and the reference surface, and
  iii. operating the control circuit in response to the position signal to precisely linearly adjust the relative distance between the object surface and the reference surface;
(d) computing information representative of variations in amplitude of intensity for each pixel from the intensity data;
(e) comparing a most recently computed value of the information for each pixel with a stored prior value of the information for that pixel;
(f) replacing the prior value of the information with the most recently computed value of the information if the most recently computed value of the information is greater than the prior value of the information;
(g) obtaining and storing a corresponding relative height of the object surface if the most recently computed value of the information is greater than the prior value of the information; and (h) varying the relative distance between the object surface and the reference surface until maximum values of the information and corresponding relative heights of the object surface are obtained and stored for each pixel, respectively.

6. A method of profiling a surface of an object, comprising the steps of:

(a) positioning the object along an optical axis so that [a predetermined feature of]the object surface is optically aligned with the imaging device;

(b) producing an interference pattern of the object surface by means of an interferometer;

(c) operating an imaging device to scan the object surface to produce intensity data for each pixel of an image of the object surface, by
 i. measuring a position value corresponding to the relative distance between the object surface and a reference surface in the interferometer and producing a position signal representing the position value,
 ii. applying the position signal as position feedback to a control circuit driving a translator connected to vary the relative distance between the object surface and the reference surface, and
 iii. operating the control circuit in response to the position signal to precisely linearly adjust the relative distance between the object surface and the reference surface;

(d) removing a constant or slow-changing component from the intensity data, as the optical path difference is varied, to produce a first digital signal;

(e) rectifying the first digital signal to produce a second digital signal including a high frequency component and a low frequency component;

(f) digitally filtering the second signal to eliminate the high frequency component from the second digital signal to thereby produce a third digital signal;

(g) locating a preselected characteristic of the third digital signal for each pixel; and (h) correlating the preselected characteristic of the third digital signal to a relative height of the object surface for each pixel.

7. A method of profiling a surface of an object, comprising the steps of:

(a) positioning the object along an optical axis so that the object surface is optically aligned with the imaging device;

(b) producing an interference pattern of the object surface by means of an interferometer;

(c) operating an imaging device to scan the object surface to produce intensity data for each pixel of an image of the object surface, by
 i. measuring a position value corresponding to the relative distance between the object surface and a reference surface in the interferometer and producing a position signal representing the position value,
 ii. applying the position signal as position feedback to a control circuit driving a translator connected to vary the relative distance between the object surface and the reference surface, and
 iii. operating the control circuit in response to the position signal to precisely linearly adjust the relative distance between the object surface and the reference surface;

(d) determining a preselected characteristic of the intensity data for each pixel; and (e) correlating the preselected characteristic to a relative height of the object surface for each pixel.

8. A device for profiling a surface of an object, comprising in combination:

(a) an imaging device;

(b) an interferometer producing an interference pattern of the object surface;

(c) a microcontroller adapted to operate the imaging device to scan the object surface to produce intensity data for each pixel of an image of the object surface, the microcontroller including
 i. a position transducer adapted to measure the relative distance between the object surface and a reference surface in the interferometer and producing a position signal representing the relative distance,
 ii. a circuit receiving the position signal, producing position information in response to the position signal, and utilizing the position information to control a translator control circuit driving the translator in order to precisely linearly adjust the relative distance between the object surface and the reference surface;

(d) the microcontroller being adapted to correlate a preselected characteristic of the intensity data to a relative height of the object surface for each pixel.

9. The device of claim 8 wherein the transducer includes a linear variable differiential transducer.

10. A device for profiling a surface of an object, comprising in combination:

(a ) an imaging device;

(b) an interferometer producing an interference pattern of the object surface;

(c) a translator adapted to move the object along an optical axis of the interferometer to vary an optical path difference between the object surface and a reference surface;

(d) a control circuit adapted to operate the imaging device to scan the object surface to produce intensity data for each pixel of an image of the object surface;

(e) digital processing circuitry adapted to perform computations on the intensity data to remove a constant or slowchanging component from the intensity data as the optical path difference is varied, to produce a first digital signal;

(f) a rectifier rectifying the first digital signal to produce a second digital signal including a high frequency component and a low frequency component;

(g) digital processing circuitry adapted to perform computations on the second digital signal to eliminate the high frequency component from the second digital signal to thereby produce a third digital signa, to locate a preselected characteristic of the third digital signal for each pixels and to correlate the preselected characteristic of the third digital signal to a relative height of the object surface for each pixel.

* * * * *